United States Patent
Youngs et al.

(10) Patent No.: US 7,108,822 B2
(45) Date of Patent: Sep. 19, 2006

(54) METHOD OF FORMING A VEHICLE TRIM PANEL

(75) Inventors: John D. Youngs, Southgate, MI (US); Edward Curtindale, Farmington Hills, MI (US); Michael P. Schoemann, Waterford, MI (US)

(73) Assignee: Lear Corporation, Southfield, MI (US)

( * ) Notice: Subject to any disclaimer, the term of this patent is extended or adjusted under 35 U.S.C. 154(b) by 392 days.

(21) Appl. No.: 10/207,333

(22) Filed: Jul. 29, 2002

(65) Prior Publication Data

US 2004/0070110 A1   Apr. 15, 2004

(51) Int. Cl.
*B29C 45/14*   (2006.01)
*B29C 45/00*   (2006.01)

(52) U.S. Cl. .................... 264/255; 264/328.7
(58) Field of Classification Search ............... 264/255, 264/328.7, 275
See application file for complete search history.

(56) References Cited

U.S. PATENT DOCUMENTS

| | | | |
|---|---|---|---|
| 5,045,268 A | 9/1991 | Sorensen | |
| 5,098,622 A | 3/1992 | Lilienthal et al. | |
| 5,328,651 A | 7/1994 | Gallagher et al. | |
| 5,618,485 A * | 4/1997 | Gajewski | 264/255 |
| 5,626,382 A | 5/1997 | Johnson et al. | |
| 5,633,289 A | 5/1997 | Nakamura et al. | |
| 5,788,906 A * | 8/1998 | Morita | 264/245 |
| 6,037,038 A | 3/2000 | Kuhr | |
| 6,183,038 B1 | 2/2001 | Hansen et al. | |
| 6,210,613 B1 | 4/2001 | Stein et al. | |
| 6,348,169 B1 | 2/2002 | Stipes et al. | |
| 6,391,232 B1 | 5/2002 | Fritsch | |
| 6,524,509 B1 * | 2/2003 | Shope et al. | 264/246 |
| 6,838,027 B1 * | 1/2005 | Brodi et al. | 264/138 |
| 2001/0028131 A1 | 10/2001 | Brodi, Jr. et al. | |
| 2002/0066972 A1 | 6/2002 | Fritsch | |
| 2002/0162623 A1 | 11/2002 | Saint-Dizier | |

* cited by examiner

*Primary Examiner*—Edmund H. Lee
(74) *Attorney, Agent, or Firm*—MacMillan, Sobanski & Todd, LLC

(57) ABSTRACT

A method of manufacturing two trim components with a common mold assembly includes providing a mold assembly having a first cavity, a second cavity, and a movable mold element. The movable mold element is movable between a first position to expose the second cavity, and a second position to obstruct the second cavity. One of the two trim components is then produced. A first trim component is produced by positioning the mold element into the first position and then introducing a first material into the first and second cavities. A second trim component is produced subsequent to the mold assembly being provided. Then, the mold element is positioned into the second position. One of the first material and a second material is then introduced into the first cavity. The mold element is then moved into the first position, and a third material is introduced into the second cavity.

2 Claims, 7 Drawing Sheets

METHOD OF FORMING A VEHICLE TRIM PANEL

TECHNICAL FIELD

This invention relates to interior vehicle trim panels. More particularly, the invention relates to a method of manufacturing interior vehicle trim panels.

BACKGROUND OF THE INVENTION

It is known to provide an interior trim panel for a vehicle which is aesthetically and/or tactilely pleasing to the vehicle occupants. However, known methods of manufacturing interior vehicle trim panels may add significant cost to each vehicle produced. It would therefore be desirable to provide an improved method of manufacturing an interior trim panel for a vehicle.

SUMMARY OF THE INVENTION

This invention relates to an improved method of manufacturing a first trim component and a second trim component with a common mold assembly. Initially, a mold assembly is provided. The mold assembly includes a first cavity, a second cavity, and a movable mold element. The movable mold element is movable between a first position to expose the second cavity, and a second position to obstruct the second cavity. One of the first trim component and the second trim component is then produced. The first trim component is produced by subsequently positioning the mold element into the first position. A first material then is introduced into the first cavity and the second cavity. The second trim component is produced subsequent to the mold assembly being provided. Then, the mold element is positioned into the second position. One of the first material and a second material is then introduced into the first cavity. The mold element is then moved into the first position. Then, a third material is introduced into the second cavity.

In another embodiment of the invention, the second trim component is produced subsequent to the mold assembly being provided. Then, a second material is introduced within one of the first cavity and the second cavity. The mold element is then positioned into the first position. Then, one of the first material and a third material is introduced into the first cavity, thereby substantially surrounding the second material with the one of the first material and the third material.

In another embodiment of the invention, the second trim component is produced subsequent to the mold assembly being provided. Then, a second material is introduced within the first cavity. The mold element is then positioned into the second position. Then, one of the first material and a third material is introduced into the first cavity, thereby substantially surrounding the second material with the one of the first material and the third material. The mold element is then moved into the first position, and a fourth material is introduced into the second cavity.

Various objects and advantages of this invention will become apparent to those skilled in the art from the following detailed description of the preferred embodiment, when read in light of the accompanying drawings.

DETAILED DESCRIPTION OF THE INVENTION

Figure 1:
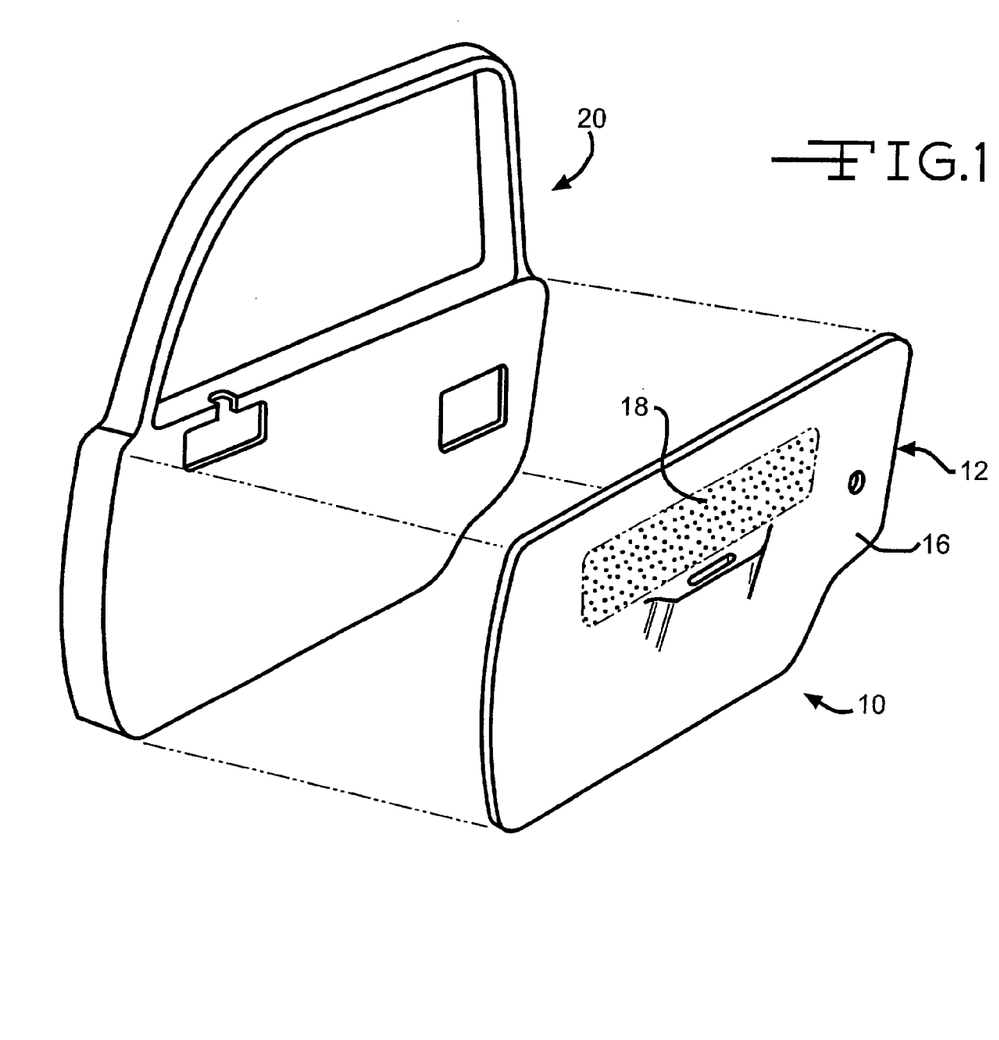
FIG. 1 is an exploded perspective view of a vehicle trim panel manufactured according to the method of this invention.

Referring now to the drawings, there is illustrated in FIG. 1 a vehicle trim panel assembly, generally shown at 10. The trim panel assembly 10 comprises a trim component or panel 12 of an electrically non-conductive material having an exterior surface 16. Preferably, the trim panel includes an accent region 18. The trim panel 16 of the preferred embodiment is an automotive door trim panel 12 which mounts to a vehicle door assembly, generally shown at 20. It will be appreciated however, that the trim panel 12 of the subject invention may be any type of trim panel associated with a vehicle. For example, other types of trim panels include trunk panels, quarter panels, rear package trays, headliners, instrument panels, garnish moldings, and console panels, among others.

The door trim panel 12 is preferably formed of a molded plastic material such as polypropylene. As appreciated by those skilled in the art, the trim panel 12 may be fabricated of other materials, such as wood fibers, polyurethane, solid molded vinyl, expanded polyurethane foam, any combination thereof, or any other suitable rigid, electrically non-conductive material. The exterior surface 16 of the trim panel 12 may include a decorative surface portion, such as accent region 18, illustrated by a phantom line. The accent region 18 is also preferably formed of a molded plastic material such as thermoplastic urethane (TPU). As will be explained in detail below, the exterior surface 16 and the accent region 18 may be formed of the same or different materials. Further, as will be explained in detail below, the exterior surface 16 and the accent region 18 may have the same or different surface textures.

Although not illustrated in FIG. 1, it will be appreciated that portions of the trim panel 12 may be covered with a decorative trim material such as cloth, vinyl, leather, and/or carpeting. The trim panel 12 may be attached to the vehicle door assembly 20 by suitable fasteners (not shown) as is well known in the art.

Figure 2:
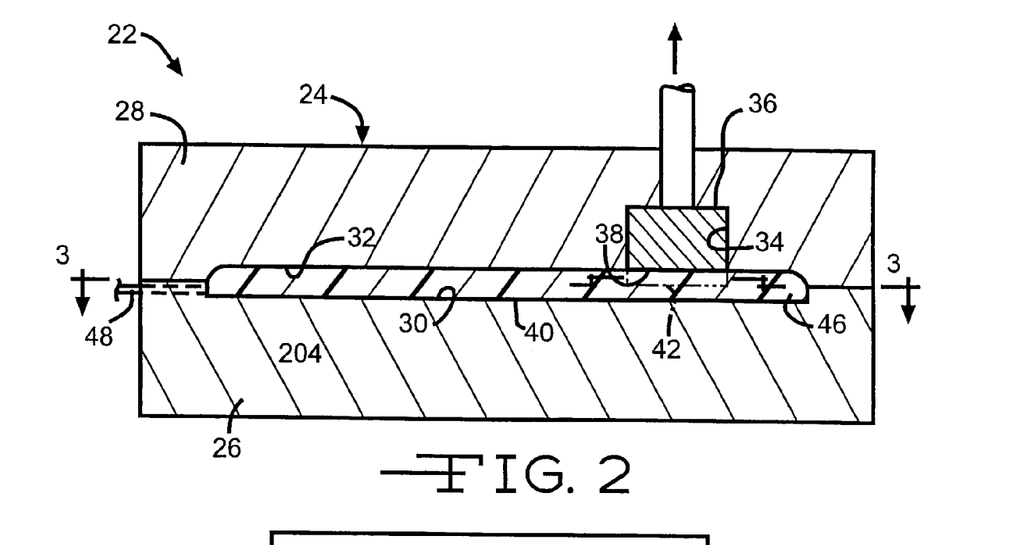
FIG. 2 is a cross sectional elevational view showing the vehicle trim panel illustrated in FIG. 1 in a mold used in accordance with a second step of the method of this invention.

Referring now to FIG. 2, there is illustrated a mold assembly, indicated generally at 24, which is adapted to be used in accordance with the method of this invention. Typically, the mold assembly 24 includes a first mold half 26 and a second mold half 28. The first mold half 26 includes a first mold surface 30, and the second mold half 28 includes a second mold surface 32. Although illustrated schematically in FIGS. 2 through 7, it will be appreciated that the mold surfaces 30 and 32 may be of any desired shape and contour. For example, first mold surface 30 might be a mold core, and second mold surface 32 might be a corresponding mold cavity. The first mold half 26 and second mold half 28 are preferably mounted to platens (not shown) of a press (not shown), such as a vertical molding press with sufficient tonnage to accomplish the method herein described. When in a closed position, as shown in FIG. 2, the first mold half 26 and the second mold half 28 form a first cavity 40.

Figure 4:
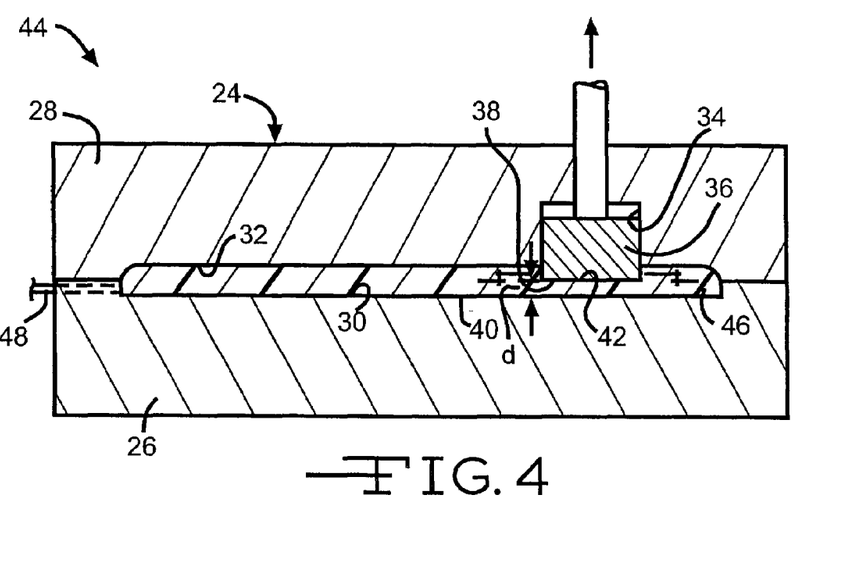
FIG. 4 is a cross sectional elevational view of the mold illustrated in FIG. 2 showing a portion of a third step of the method of this invention.

The second mold half 28 includes a core cavity 34 for slidably receiving a movable mold element or core 36. The movable core 36 can include a third mold surface 38, and is movable between a first position, as shown in FIG. 2, and a second position, as shown in FIG. 4. When in the second position, the core 36 defines a second cavity 42, shown in FIG. 2 in phantom line.

It will be appreciated, that in accordance with each embodiment of the invention, as will be described below, a first step of the method of the invention includes providing a suitable mold assembly 24, 24', and 102.

Figure 3:
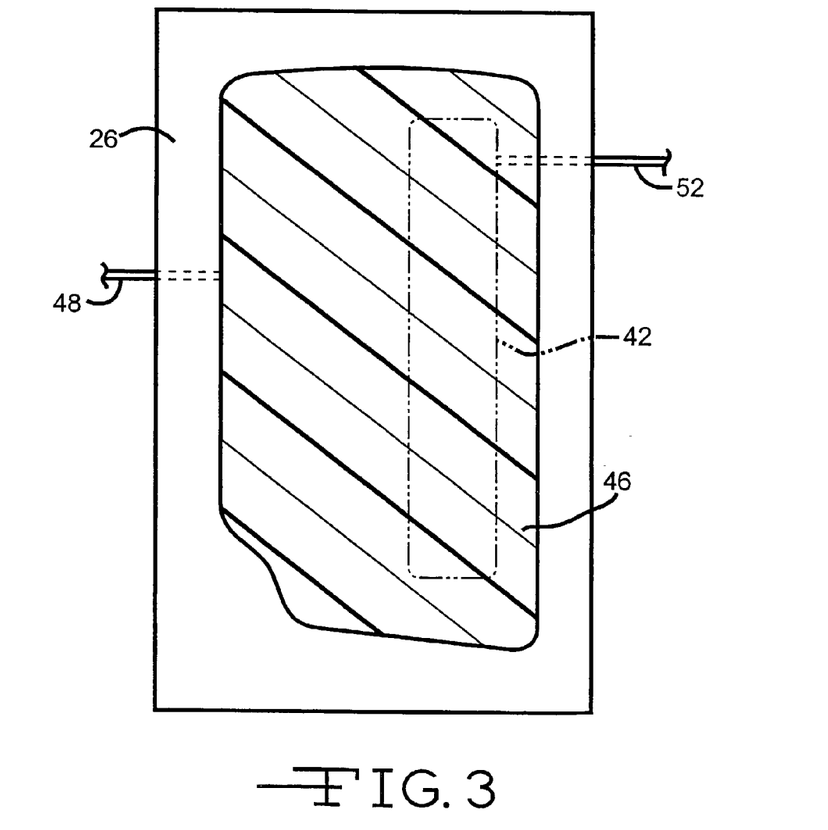
FIG. 3 is a reduced cross-sectional view of the vehicle trim panel and mold illustrated in FIG. 2, taken along line 3—3 of FIG. 2.

A second step of the method of this invention is illustrated generally at 22 in FIG. 2. In the second step 22, the core 36 is moved upwardly, as viewed in FIG. 2, within the core cavity 34, and into a first position. The first position is defined as a position wherein the third mold surface 38 of the core 36 defines a portion of the second mold surface 32, thereby substantially exposing the second cavity 42. A first material 46 is then introduced into the first cavity 40 and the second cavity 42 through a first passage 48. Preferably the first material 46 is molten plastic, such as polypropylene. As shown in FIG. 3, both the first cavity 40 and the second cavity 42 are filled with the first material 46. The first material 46 then conforms to the shape of the first cavity 40 and the second cavity 42, shown in phantom line in FIG. 6, thereby forming the trim panel 12. The trim panel 12 is then removed from the mold assembly 24 by any suitable method (not shown).

Figure 5:
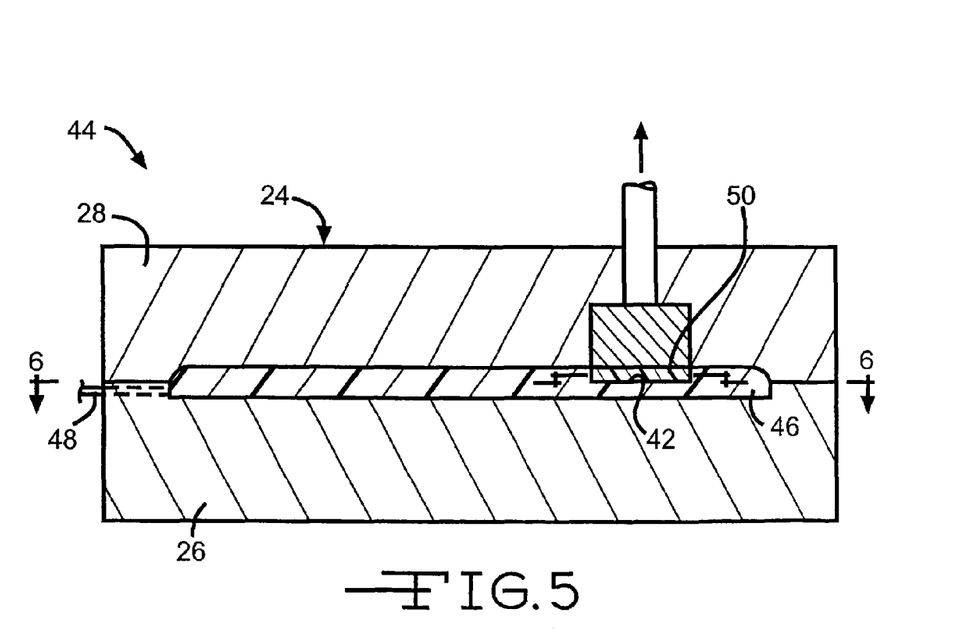
FIG. 5 is a cross sectional elevational view of the mold illustrated in FIG. 4 showing an additional portion of the third step of the method of this invention.

A third step of the method of this invention is illustrated generally at 44 in FIGS. 4 and 5. In the third step 44, the core 36 is moved downwardly within the core cavity 34, as viewed in FIG. 4, and into a second position. The second position is defined as a position wherein the third mold surface 38 of the core 36 is positioned in a spaced relationship at a distance d from the first surface 30. The core 36 thereby substantially obstructs the second cavity 42. Preferably, the distance d is any desired distance greater than or equal to zero.

Figure 6:
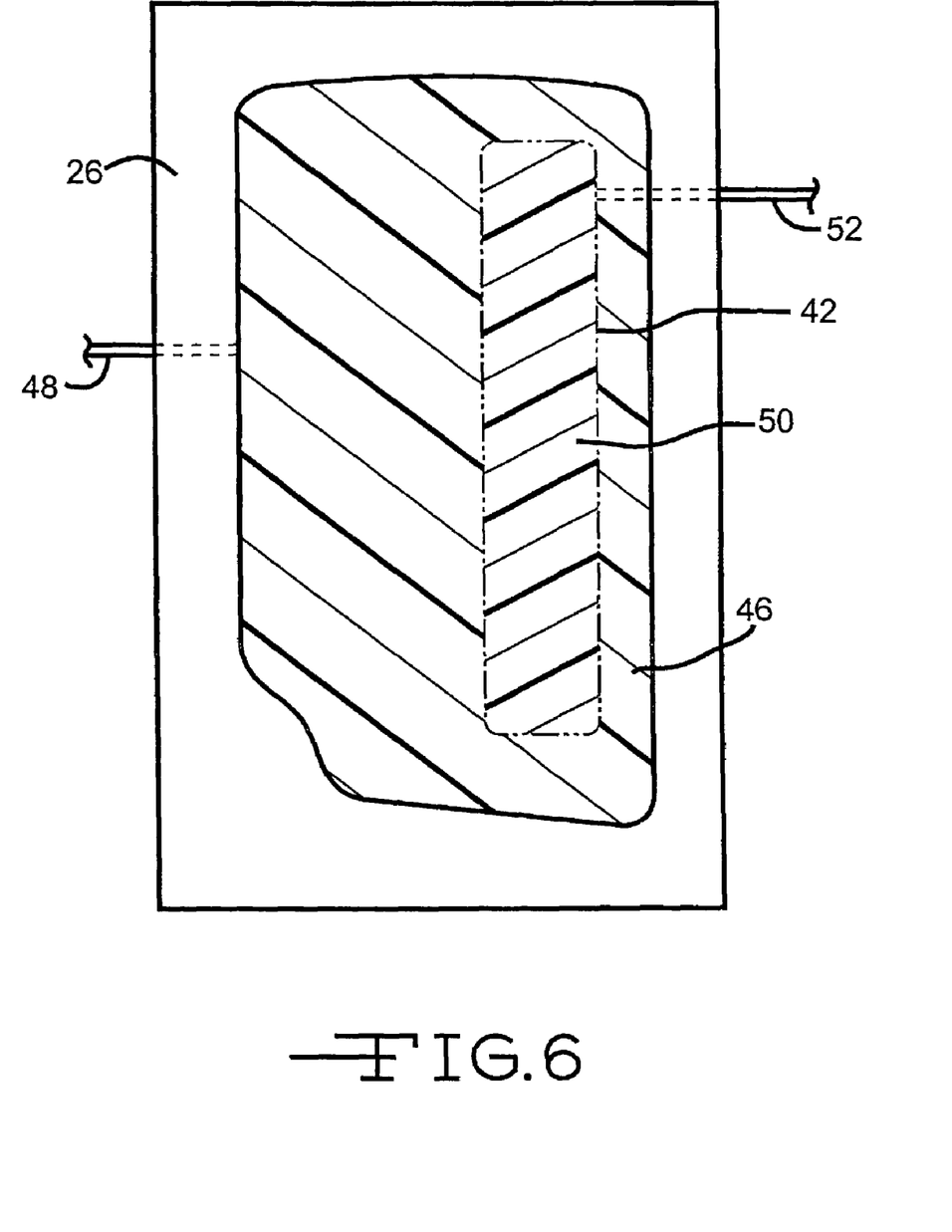
FIG. 6 is a reduced cross-sectional view of the vehicle trim panel and mold illustrated in FIG. 5, taken along line 6—6 of FIG. 5.

A material is then introduced into the first cavity 40 through the first passage 48. The material may be any suitable material, such as the first material 46. Preferably the material is the first material 46, and is molten plastic, such as polypropylene, although the first material 46 is not required. The core 36 is then is moved upwardly within the core cavity 34, as viewed in FIG. 5, and into the first position, thereby exposing the second cavity 42. A second material 50 is then introduced into the second cavity 42 through a second passage 52, as shown in FIG. 6. The second material 50 may be molten plastic, such as polypropylene. Preferably, however, the second material 50 has characteristics different from the first material 46, thereby creating an accent region 18 having an aesthetically and tactilely pleasing surface.

For example, the first and second materials 46 and 50 may be of the same material but of different colors, thereby producing a two-color, one-material trim panel 12. Preferably, however, the first and second materials 46 and 50 are of different material. For example, the first material 46 is preferably a harder material, such as polypropylene, and the second material 50 is a softer material, such as TPU or thermoplastic elastomer (TPE). As shown in FIGS. 5 and 6, the first material 46 then conforms to the shape of the first cavity 40 and the second material conforms to the shape of the second cavity 42, thereby forming the trim panel 12. The trim panel 12 is then removed from the mold assembly 24 by any suitable method.

An important aspect of the method of the invention is that the second step 22 may be performed prior to the third step 44, or the third step 44 may be performed prior to the second step 22. It has been discovered that such a method reduces costs by providing for the production of multiple trim panels using one mold assembly 24, and substantially reduces trim panel assembly time.

Figure 7:
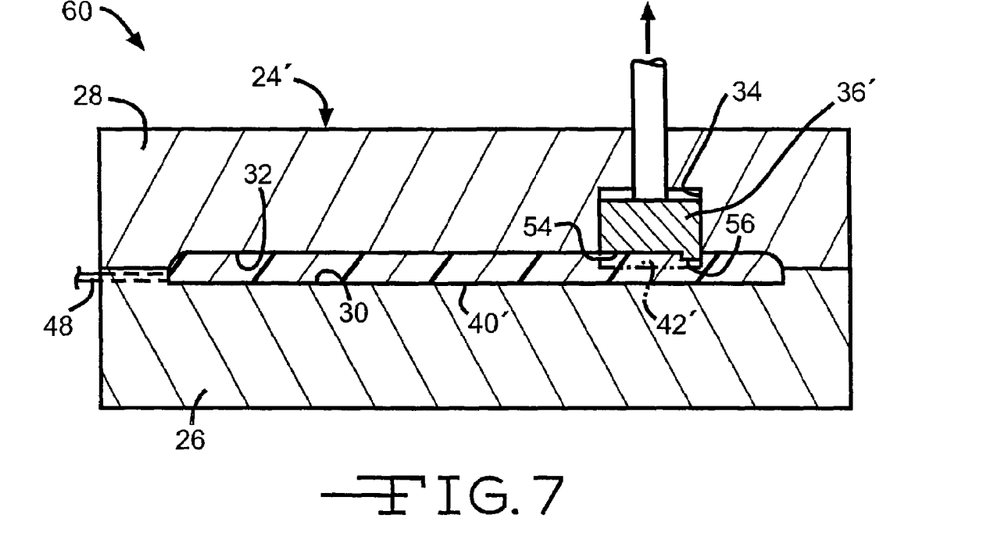
FIG. 7 is a cross sectional elevational view showing the vehicle trim panel illustrated in FIG. 1 in a mold used in accordance with a third step of an alternate embodiment of the method of this invention.
Figure 8:
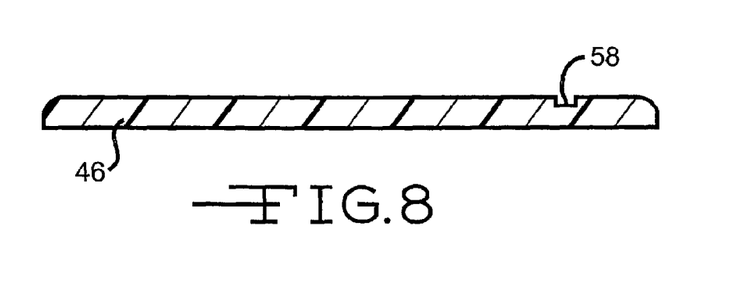
FIG. 8 is a cross sectional elevational view of a vehicle trim panel showing the trim panel after the first step of the alternate embodiment of the method of this invention.
Figure 9:
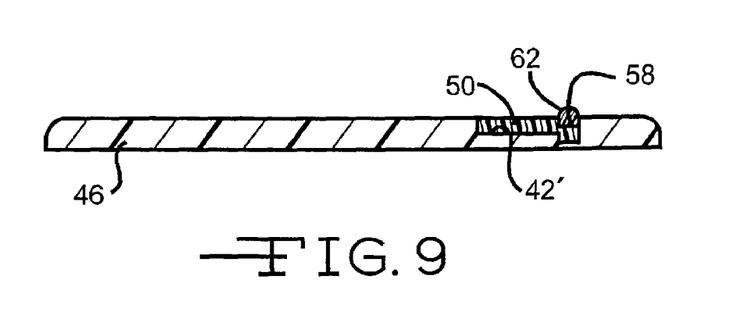
FIG. 9 is a cross sectional elevational view of the vehicle trim panel illustrated in FIG. 7 showing the trim panel after the third step of the alternate embodiment of the method of this invention.

FIGS. 7 through 9 illustrate a first alternate embodiment of the mold assembly 24' according to a first alternate embodiment of the method. The mold assembly 24' is substantially identical to the mold assembly 24 shown in FIG. 2, except that the second mold half 28 of the mold assembly 24' includes a movable core 36'. The core 36' includes a fourth mold surface 54, and a fifth mold surface 56. The core 36' is movable between a first position, as shown in FIG. 7, and a second position, (not shown). When in the second position, the core 36' defines a second cavity 42', and a third cavity or channel 58, as shown in FIG. 9.

A second step of a first alternate embodiment of the method of this invention is illustrated generally at 60 in FIG. 7, and is substantially identical to the second step 22. In the second step 60 of the first alternate embodiment, the core 36' is moved upwardly within the core cavity 34, as viewed in FIG. 7, and into the first position. The first position is defined as a position wherein the fourth mold surface 54 of the core 36' defines a portion of the second mold surface 32, and the fifth mold surface 56 obstructs a portion of the second cavity 42', shown in phantom line in FIG. 7. The fifth mold surface 56 thereby defines the channel 58, as shown in FIGS. 8 and 9.

A first material 46 is then introduced into the first cavity 40' and the second cavity 42'. As described in regards to the second step 22, both the first cavity 40' and the second cavity 42' are filled with the first material 46. The first material 46 then conforms to the shape of the first cavity 40' and the second cavity 42', thereby forming the trim panel 12. The trim panel 12 is then removed from the mold assembly 24 by any suitable method. As shown in FIG. 8, the trim panel 12 formed according to the first alternate embodiment of the method includes the channel 58 which has a shape corresponding to the shape of the fifth mold surface 56.

A third step of the first alternate embodiment of the method is not illustrated, but is substantially identical to the third step 44. In the third step, the core 36' is moved downwardly within the core cavity 34, whereby the core 36' obstructs the second cavity 42', and into a second position (not shown). It will be understood, however, that in the second position, the mold surfaces 54 and 56 of the core 36' will be substantially defined by the phantom line 42'.

A material is then introduced into the first cavity 40' through the first passage 48. The material may be any suitable material, such as the first material 46, or the second material 50. Preferably the material is the first material 46, and is molten plastic, such as polypropylene. The core 36' is then is moved upwardly within the core cavity 34, as viewed in FIG. 7, and into the first position, thereby exposing the second cavity 42'. The second material 50 is then introduced into the second cavity 42', as shown in phantom line in FIG. 7. Preferably, the second material 50 is different from the first material 46, thereby creating an accent region 18 having an aesthetically and tactilely pleasing surface. The trim panel 12 is then removed from the mold assembly 24' by any suitable method, thereby exposing the channel 58. A third material 62 is then mounted within the channel 58 by any suitable means, such as adhesive, hook and loop fasteners, or threaded fasteners. Preferably, the third material 62 is a decorative strip, such as plastic, fabric, or wood.

It will be appreciated that the second step 60 of the first alternate embodiment may be performed prior to the third step, or the third step may be performed prior to the second step 60.

Figure 10:
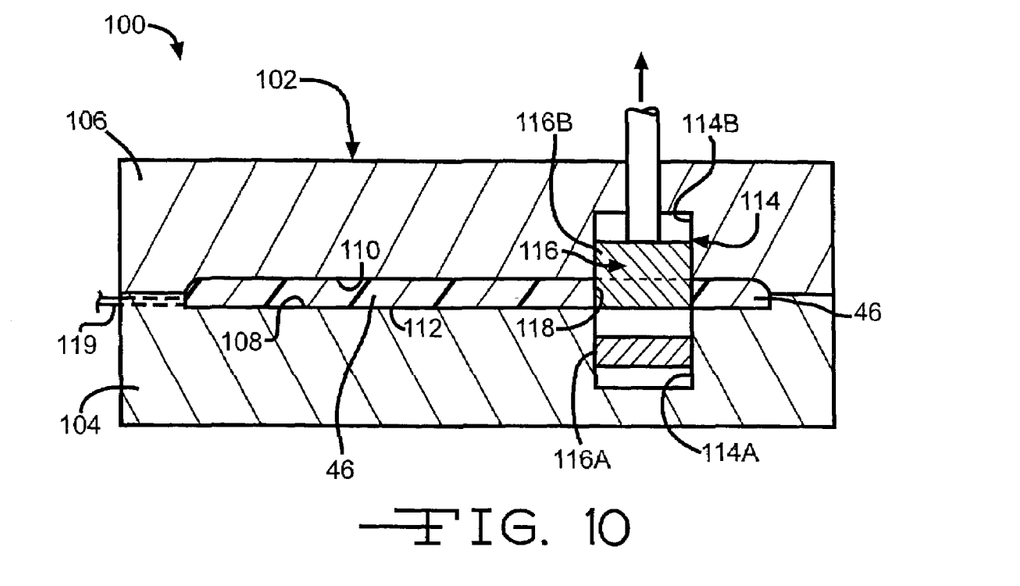
FIG. 10 is a cross sectional elevational view showing the vehicle trim panel illustrated in FIG. 1 in mold used in accordance with a portion of a third step of an additional alternate embodiment of the method of this invention.
Figure 11:
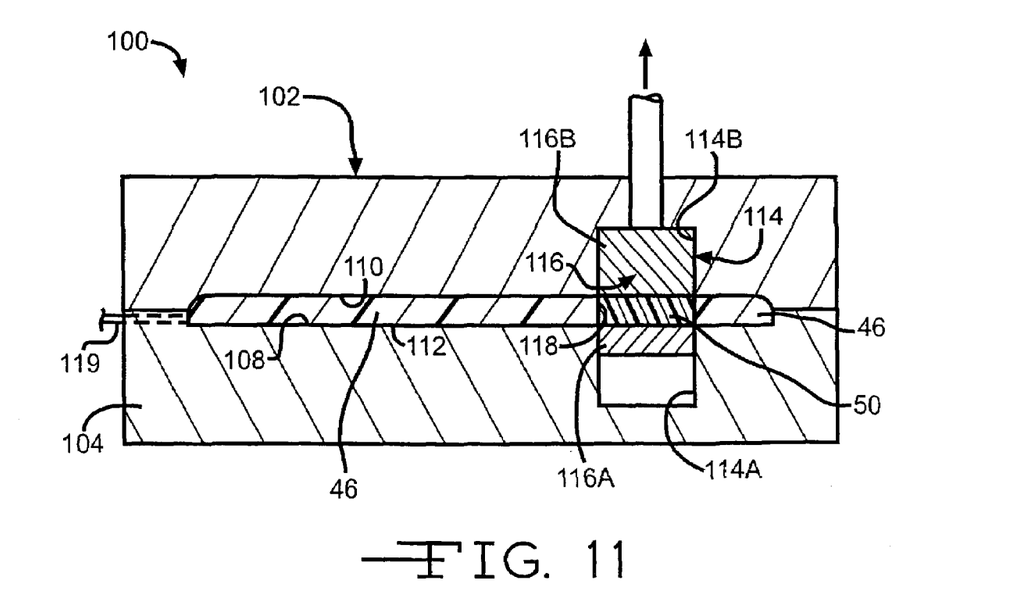
FIG. 11 is a cross sectional elevational view showing the vehicle trim panel showing a additional portion of the third step of the alternate embodiment of the method illustrated in FIG. 10.

FIGS. 10 and 11 illustrate a second alternate embodiment of the mold assembly 102 according to a second alternate embodiment of the method. Typically, the mold assembly 102 includes a first mold half 104 and a second mold half 106. The first mold half 104 includes a first surface 108, and the second mold half 106 includes a second mold surface 110. Although illustrated schematically in FIGS. 10 and 11, it will be appreciated that the mold surfaces 108 and 110 may be of any desired shape and contour. For example, first mold surface 108 might be a mold core, and second mold surface 10 might be a corresponding mold cavity. When in a closed position, as shown in FIG. 11, the first mold half 104 and the second mold half 106 form a first cavity 112.

The first mold half 104 includes a first portion 114A of a core cavity 114. The second mold half 106 includes a second portion 114B of the core cavity 114 for slidably receiving a movable mold element or core 116. The movable core 116 includes a first half 116A, a second half 116B and a core cavity 116C. The core 116 is movable between a first position, as shown in FIG. 11, and a second position, as shown in FIG. 10. When in the second position, the core 116 defines a second cavity 118, as shown in FIG. 10. When in the first position, the core cavity 116C defines the second cavity 118, as shown in FIG. 11.

A second step of a second alternate embodiment of the method is not illustrated, but substantially identical to the second step 22. In the second step of the second alternate embodiment, the core 116 is moved upwardly within the core cavity 114, as viewed in FIG. 11, and into the first position. The first position is defined as a position wherein the core cavity 116C is substantially aligned with the first cavity 112. A first material 46 is then introduced into the first cavity 112 and the second cavity 118 through a first passage 119. As described in regards to the second step 22, both the first cavity 112 and the second cavity 118 are filled with the first material 46. The first material 46 then conforms to the shape of the first cavity 112 and the second cavity 118, thereby forming the trim panel 12. The trim panel 12 is then removed from the mold assembly 102 by any suitable method.

A third step of the second alternate embodiment of the method is illustrated generally at 100 in FIGS. 10 and 11. In the third step 100, the core 116 is moved downwardly within the core cavity 114, as viewed in FIG. 10, and into the second position. The first material 46, or any desired material, is then introduced into the first cavity 112. The core 116 is then is moved upwardly within the core cavity 114, as viewed in FIG. 11, and into the first position, thereby exposing the second cavity 118. A second material, such as the second material 50, or any desired material, is then introduced into the second cavity 118, as shown in FIG. 11. Preferably, the second material 50 is different from the first material 46, thereby creating the accent region 18, as shown in FIG. 1, having an aesthetically and tactilely pleasing surface.

The trim panel 12 is then removed from the mold assembly 24 by any suitable method. For example, after the first mold half 104 is moved outwardly from the second mold half 106, the first core half 116A may be at least partially separated from the second core half 116B so as allow removal of the trim panel 12 from the core cavity 116C. It will be appreciated that the second step of the second alternate embodiment may be performed prior to the third step 100, or the third step 100 may be performed prior to the second step.

Figure 12:
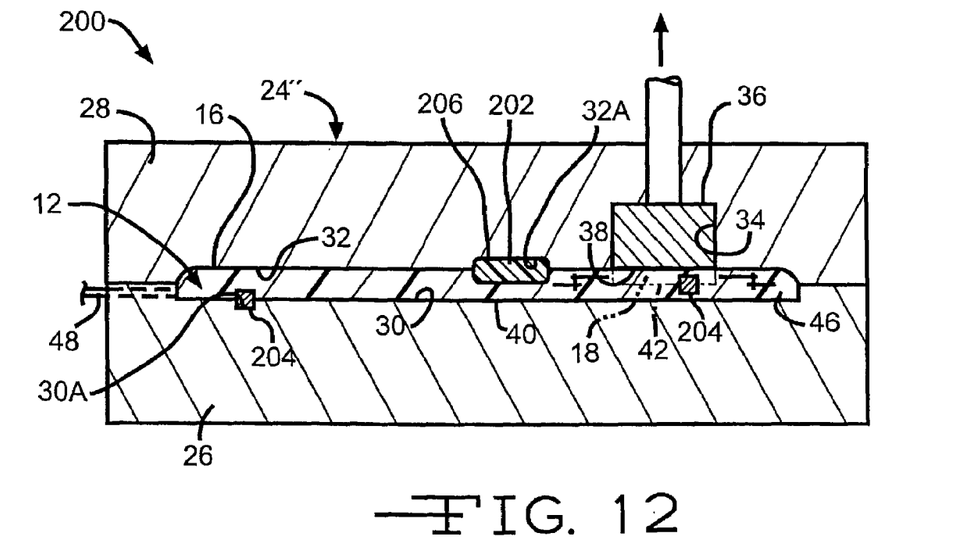
FIG. 12 is a cross sectional elevational view showing the vehicle trim panel illustrated in FIG. 1 in a mold used in accordance with a third step of an additional alternate embodiment of the method of this invention.

FIG. 12 illustrates a third alternate embodiment of the mold assembly 24" according to a third alternate embodiment of the method. The mold assembly 24" is substantially identical to the mold assembly 24 illustrated in FIG. 2, and will not be further described herein.

A second step of the third alternate embodiment of the method of this invention is substantially identical to the second step 22 shown in FIG. 2. A third step of the third alternate embodiment of the method is illustrated generally at 200 in FIG. 12. In the third step, a fourth material can be introduced within the first cavity 40 or the second cavity 42. The fourth material can be any suitable material such as a first insert 202 or a second insert 204. The insert 202 can be any desired insert formed from any desired material, such as polypropylene or steel. Preferably, the first insert 202 is relatively rigid having a decorative or ornamental surface 206 that will be visible to a vehicle occupant. The first insert 202 can be positioned within a cavity 32A formed in the mold surface 32, or can be positioned such that the surface 206 is adjacent the mold surface 32. Although only one first insert 202 in illustrated in FIG. 12, any desired number of first inserts 202 can be provided in the trim panel 12.

The second insert 204 can be any desired insert, such as a fastener. The insert 204 can be formed from any desired material, such as polypropylene or steel. Preferably, the second insert 204 is positioned such that the insert 204 will not be visible to a vehicle occupant, such as within the trim panel 12, or opposite the surface 16, as shown in FIG. 12. The second insert 204 can be positioned within a cavity 30A formed in the mold surface 30, positioned such that the insert 204 is adjacent the mold surface 30, or positioned such that the insert 204 will be within the trim panel 12. Although two second inserts 204 are illustrated in FIG. 12, any desired number of second inserts 204 can be provided in the trim panel 12.

The core 36 can remain in the first position, as shown in FIG. 12, so that a material can then be introduced into the first cavity 40 through the first passage 48. The material may be any suitable material, such as the first material 46, or the second material 50. The material 46 or 50 thereby substantially surrounds the inserts 202 and 204.

Alternately, the core 36 can be moved downwardly into the second position, as shown in FIG. 4. A material, such as first material 46 or second material 50, is then introduced into the first cavity 40, as described above. The core 36 can then be moved upwardly within the core cavity 34, and into the first position, thereby exposing the second cavity 42. A desired material, such as the second material 50, is then introduced into the second cavity 42, as shown in phantom line in FIG. 12. Preferably, the second material 50 is different from the first material 46, thereby creating the accent region 18. The trim panel 12 is then removed from the mold assembly 200 by any suitable method.

It will be appreciated that the second step of the third alternate embodiment may be performed prior to the third step 200, or the third step 200 may be performed prior to the second step. It will be further appreciated that the third alternate embodiment can be performed using the mold 24', as shown in FIG. 12, the mold 24, as shown in FIG. 2, the mold 24', as shown in FIG. 7, the mold 102, as shown in FIG. 10, or any desired mold assembly.

The principle and mode of operation of this invention have been described in its preferred embodiments. However, it should be noted that this invention may be practiced otherwise than as specifically illustrated and described without departing from its scope.

What is claimed is:

1. A method of manufacturing a first trim component and a second trim component for an interior of a vehicle, the method comprising the steps of:
   a. providing a mold assembly defining a first cavity and a second cavity, the mold assembly including a movable mold element which is movable between a first position to expose the second cavity, and a second position to obstruct the second cavity;
   b. positioning the mold element into the first position;
   c. subsequently to step (b) introducing a first material into the first cavity and the second cavity to form the first trim component, and
   d. subsequently to step (c), removing the first trim component from the mold assembly, positioning the mold element into the second position, introducing one of the first material and a second material into the first cavity, moving the mold element into the first position, and introducing a third material into the second cavity to form a second trim component different from the first trim component.

2. A method of manufacturing a first trim component and a second trim component for an interior of a vehicle, the method comprising the steps of:
   a. providing a mold assembly defining a first cavity and a second cavity, the mold assembly including a movable mold element which is movable between a first position to connect the second cavity and the first cavity, and a second position to occupy the second cavity;
   b. moving the mold element into the first position;
   c. introducing a first material into at least one of the first cavity and the second cavity to form at least a portion of the first trim component, and
   d. subsequently to step (c), removing the first trim component from the mold assembly, positioning the mold element into the second position, introducing one of the first material and a second material into the first cavity, moving the mold element into the first position, and introducing a third material into the second cavity to form a second trim component.

* * * * *